United States Patent
Hikazudani et al.

(10) Patent No.: US 9,266,746 B2
(45) Date of Patent: Feb. 23, 2016

(54) PRODUCTION METHOD OF MAYENITE

(71) Applicants: Hitachi Zosen Corporation, Osaka-shi (JP); Kyoto University, Kyoto-shi (JP)

(72) Inventors: Susumu Hikazudani, Osaka (JP); Atsushi Wakui, Osaka (JP); Masaharu Furutera, Osaka (JP); Hitoshi Oshiro, Osaka (JP); Tetsuya Inoue, Osaka (JP); Kazuyuki Hirao, Kyoto (JP)

(73) Assignees: Hitachi Zosen Corporation, Osaka-shi (JP); Kyoto University, Kyoto-shi (JP)

( * ) Notice: Subject to any disclaimer, the term of this patent is extended or adjusted under 35 U.S.C. 154(b) by 0 days.

(21) Appl. No.: 14/387,399

(22) PCT Filed: Jan. 11, 2013

(86) PCT No.: PCT/JP2013/050441
§ 371 (c)(1),
(2) Date: Sep. 23, 2014

(87) PCT Pub. No.: WO2013/145806
PCT Pub. Date: Oct. 3, 2013

(65) Prior Publication Data
US 2015/0050209 A1    Feb. 19, 2015

(30) Foreign Application Priority Data
Mar. 28, 2012    (JP) ................. 2012-073982

(51) Int. Cl.
*C01F 7/00*    (2006.01)
*C01F 7/16*    (2006.01)

(52) U.S. Cl.
CPC ............. *C01F 7/164* (2013.01); *C01P 2002/72* (2013.01)

(58) Field of Classification Search
None
See application file for complete search history.

(56) References Cited

U.S. PATENT DOCUMENTS

| 2005/0279279 A1 | 12/2005 | Hosono et al. |
| 2008/0265774 A1 | 10/2008 | Webster et al. |

FOREIGN PATENT DOCUMENTS

| JP | 2006-083009 A | 3/2006 |
| JP | 2010-132467 A | 6/2010 |
| JP | 2013-006734 A | 1/2013 |
| WO | WO-03/089373 A1 | 10/2003 |
| WO | WO-2008/023673 A1 | 2/2008 |
| WO | WO-2011/005114 A1 | 1/2011 |

OTHER PUBLICATIONS

J.M. Rivas-Mercury et al., "Dehydration of $Ca_3Al_2(SiO_4)y(OH)_{4(3-y)}$ (0<y<0.176) studied by neutron thermodiffractometry", Journal of the European Ceramic Society, available online Mar. 19, 2008, vol. 28, pp. 1737-1748.
International Search Report mailed Feb. 12, 2013, issued for PCT/JP2013/050441.

*Primary Examiner* — Steven Bos
(74) *Attorney, Agent, or Firm* — Locke Lord LLP; James E. Armstrong, IV; Nicholas J. DiCeglie, Jr.

(57) ABSTRACT

The present invention provides a production method of mayenite in which mayenite can be produced without requiring a high-temperature treatment, and the cost of equipment and heating cost are inexpensive, and in its turn, the production cost of mayenite is inexpensive. The production method of mayenite is characterized in that mayenite ($Ca_{12}Al_{14}O_{33}$) is formed by baking katoite [$Ca_3Al_2(OH)_{12}$]. A baking temperature of katoite is preferably from 300 to 500° C. In addition, it is preferable to use, as the katoite, a product generated by introducing aluminum and calcium hydroxide [$Ca(OH)_2$] into water and allowing them to react with water.

3 Claims, 2 Drawing Sheets

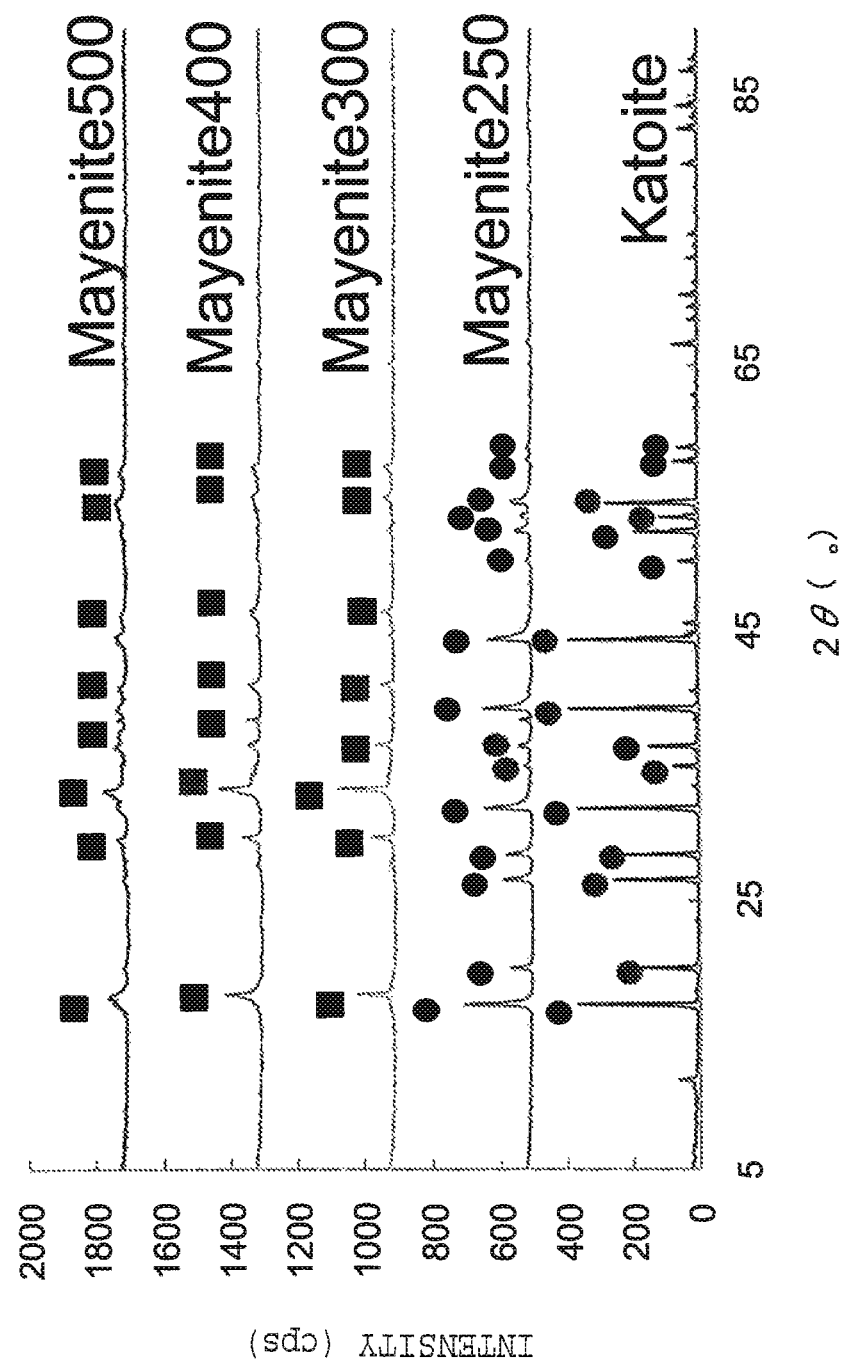

PRODUCTION METHOD OF MAYENITE

TECHNICAL FIELD

The present invention relates to a production method of mayenite.

BACKGROUND ART

In general, mayenite has hitherto been produced as, for example, a component of a protective layer for covering a dielectric layer of a plasma display panel (hereinafter referred to as "PDP") by various methods.

The following Patent Document 1 discloses a production method of an oxide containing a mayenite type compound by using, as a raw material, a combination of a calcium compound and an aluminum compound or a compound containing calcium and aluminum and describes a production method of an oxide, which is characterized by including a step of mixing the above-described raw material to produce a mixture of the raw material and a step of heating and holding the mixed raw material in a reducing atmosphere at 1,200° C. or higher and lower than 1,415° C. in an inert gas atmosphere where an oxygen partial pressure is not more than 1,000 Pa or in a vacuum atmosphere.

In addition, the following Patent Document 2 discloses an invention of a plasma display panel (PDP), and with respect to mayenite to be used as a component of a protective layer for covering a dielectric layer of PDP, Patent Document 2 describes a method in which a raw material prepared by compounding and mixing calcium oxide (CaO) and aluminum oxide ($Al_2O_3$) in a prescribed proportion is heated to from 1,200 to 1,350° C. in air to produce a mayenite type compound by a solid phase reaction.

BACKGROUND ART DOCUMENT

Patent Document

Patent Document 1: JP-A-2010-132467
Patent Document 2: WO2008/023673

SUMMARY OF THE INVENTION

Problems to be Solved by the Invention

However, in the production methods of mayenite described in the above-described Patent Documents 1 and 2, it is required to subject the mixed raw material of CaO and $Al_2O_3$ to a high-temperature treatment in air, so that there was involved such a problem that the cost of equipment and heating cost are expensive, and in its turn, the production cost is expensive. For this reason, a production method of mayenite which does not require the high-temperature treatment has been demanded.

An object of the invention is to solve the above-described problem of the background art and to provide a production method of mayenite in which mayenite can be produced without requiring a high-temperature treatment, and the cost of equipment and heating cost are inexpensive, and in its turn, the production cost of mayenite is inexpensive.

Means for Solving the Problem

In order to attain the foregoing object, an invention of a production method of mayenite of the invention is characterized in that mayenite ($Ca_{12}Al_{14}O_{33}$) is formed by baking katoite [$Ca_3Al_2(OH)_{12}$].

An aspect of the invention of is concerned with the production method of mayenite, which is characterized in that a baking temperature is from 300 to 500° C.

An aspect of the invention is concerned with the production method of mayenite, which is characterized in that the katoite is one generated by introducing aluminum and calcium hydroxide [$Ca(OH)_2$] into water and allowing them to react with water.

An aspect of the invention is concerned with the production method of mayenite, which is characterized in that a temperature of water is room temperature, and a molar ratio of aluminum to calcium hydroxide is from 2/3 to 7/6.

Effects of the Invention

An aspect of the invention of the production method of mayenite is characterized in that mayenite is formed by baking katoite, and according to the invention, there give rises to such effects that mayenite can be produced without requiring a high-temperature treatment of heating to from 1,200 to 1,350° C. in air as stated in BACKGROUND ART; and that the cost of equipment and heating cost are inexpensive, and in its turn, the production cost of mayenite is inexpensive.

In the production method of mayenite according to the invention, it is preferable that a baking temperature of katoite is from 300 to 500° C.

An aspect of the invention is concerned with the production method of mayenite, which is characterized in that the katoite is one generated by introducing aluminum and calcium hydroxide into water and allowing them to react with water, and according to the invention, even in the production of katoite that is a raw material of mayenite, there give rise to such effects that mayenite can be produced without requiring a high-temperature treatment; and that the cost of equipment and heating cost are inexpensive, and in its turn, the production cost of mayenite is inexpensive.

An aspect of the invention is concerned with the production method of mayenite, which is characterized in that in a formation reaction of katoite, a temperature of water is room temperature, and a molar ratio of aluminum to calcium hydroxide is from 2/3 to 7/6, and according to the invention, even in the production of katoite that is a raw material of mayenite, there give rise to such effects that mayenite can be produced without requiring a high-temperature treatment; and that the cost of equipment and heating cost are inexpensive, and in its turn, the production cost of mayenite is inexpensive.

BRIEF DESCRIPTION OF THE DRAWINGS

FIG. 2 is a chart showing patterns of measurement results of XRD (X-ray diffraction spectroscopy) in experiments of Examples 1 to 3 in which mayenite was produced by the method of the invention and an experiment of Comparative Example.

MODES FOR CARRYING OUT THE INVENTION

Figure 1:
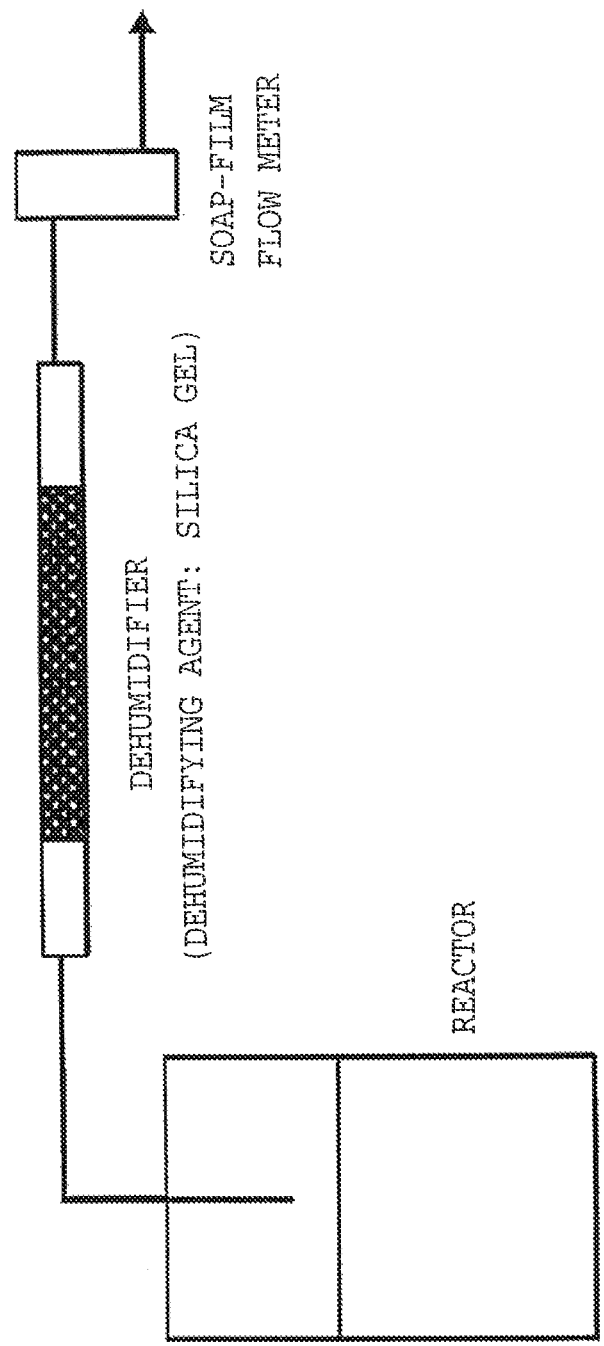
FIG. 1 is a diagrammatic flow sheet showing an example of a testing apparatus for hydrogen production in which the production method of mayenite of the invention was carried out.

Next, embodiments of the invention are described, but it should not be construed that the invention is limited thereto.

In the production method of mayenite according to the invention, the invention of the production method of mayenite is characterized in that mayenite ($Ca_{12}Al_{14}O_{33}$) is formed by baking katoite [$Ca_3Al_2(OH)_{12}$].

As described above, when katoite is baked, mayenite is generated according to the following reaction formula.

$$7Ca_3Al_2(OH)_{12} \rightarrow Ca_{12}Al_{14}O_{33} + 9Ca(OH)_2 + 33H_2O$$

In the production method of mayenite according to the invention, it is preferable that a baking temperature of katoite is from 300 to 500° C.

Here, when the baking temperature of katoite is lower than 300° C., a dehydration reaction does not sufficiently proceed, and the yield is poor, and hence, such is not preferable. In addition, when the baking temperature of katoite exceeds 500° C., a crystal structure of katoite is broken, and the yield is poor, and hence, such is not preferable.

According to the production method of mayenite according to the invention, mayenite can be produced without requiring a high-temperature treatment of heating to from 1,200 to 1,350° C. in air as stated in BACKGROUND ART, and the cost of equipment and heating cost are inexpensive, and in its turn, the production cost of mayenite is inexpensive.

In the production method of mayenite according to the invention, it is preferable that the katoite is one generated by introducing aluminum and calcium hydroxide [$Ca(OH)_2$] into water and allowing them to react with water.

That is, when aluminum and calcium hydroxide are introduced into water and allowed to react with water, katoite [$Ca_3Al_2(OH)_{12}$] is generated according to the following reaction.

$$3Ca(OH)_2 + 2Al + 6H_2O \rightarrow Ca_3Al_2(OH)_{12} + 3H_2$$

It is preferable that in a formation reaction of katoite, a temperature of water is room temperature, and a molar ratio of aluminum to calcium hydroxide is from 2/3 to 7/6.

According to such methods, even in the production of katoite that is a raw material of mayenite, katoite can be produced without requiring a high-temperature treatment, and the cost of equipment and heating cost are inexpensive, and in its turn, the production cost of mayenite is inexpensive.

EXAMPLES

Next, the Examples of the invention are described together with the Comparative Example, but it should not be construed that the invention is limited to these Examples.

Example 1

The production method of mayenite according to the invention was carried out by using a testing apparatus for hydrogen production shown in FIG. 1.

First of all, 200 mL of ion-exchanged water was charged in a reactor (separable flask) having a capacity of one liter. Subsequently, 9 g of an aluminum powder (a trade name: #150, manufactured by Minalco Ltd.) and 12 g of calcium hydroxide [$Ca(OH)_2$] (manufactured by Wako Pure Chemical Industries, Ltd.) were introduced into the reactor, followed by stirring.

When aluminum and calcium hydroxide were allowed to react with water, katoite [$Ca_3Al_2(OH)_{12}$] and hydrogen ($H_2$) were generated according to the following reaction.

$$3Ca(OH)_2 + 2Al + 6H_2O \rightarrow Ca_3Al_2(OH)_{12} + 3H_2$$

Here, from a pattern of measurement results of XRD (X-ray diffraction spectroscopy) shown in FIG. 2, peaks assigned to a structure of katoite are shown, and it could be confirmed that katoite was formed.

A generated hydrogen gas was allowed to pass through a dehumidifier filled with a silica gel as a dehumidifying agent to remove water, and a generation amount thereof was then measured by a soap-film flow meter. A component of the generated gas was analyzed by a TCD (thermal conductivity detector) type gas chromatograph (a trade name: GC-8A, manufactured by Shimadzu Corporation) and confirmed to be hydrogen.

After completion of generation of a hydrogen gas, the ion-exchanged water was filtered, and a separated solid was dried in air at a temperature of 70° C.

The obtained solid was katoite, and when this was baked in air at a temperature of 300° C. for 2 hours, mayenite ($Ca_{12}Al_{14}O_{33}$) was generated according to the following reaction formula. A yield of mayenite was 70%.

$$7Ca_3Al_2(OH)_{12} \rightarrow Ca_{12}Al_{14}O_{33} + 9Ca(OH)_2 + 33H_2O$$

Here, from a pattern (Mayenite 300) of measurement results of XRD (X-ray diffraction spectroscopy) shown in FIG. 2, peaks assigned to a structure of mayenite are shown, and it was confirmed that mayenite was formed.

In the light of the above, according to the production method of mayenite of the invention, mayenite can be produced without requiring a high-temperature treatment of heating to from 1,200 to 1,350° C. in air as in the background art, and the cost of equipment and heating cost are inexpensive, and in its turn, the production cost of mayenite is inexpensive.

In addition, in the production method of mayenite according to the invention, by using, as the katoite, a product generated by introducing aluminum and calcium hydroxide [$Ca(OH)_2$] into water and allowing them to react with water, even in the production of katoite that is a raw material of mayenite, a high-temperature treatment is not required, and the cost of equipment and heating cost are inexpensive, and in its turn, the production cost of mayenite is inexpensive.

Examples 2 and 3

Although mayenite is produced in the same manner as that in the case of Example 1, a different point from the case of Example 1 resides in a point that the baking temperature of katoite was set to 400° C. in Example 2 and 500° C. in Example 3, respectively. As a result, from patterns (Mayenite 400 and Mayenite 500) of measurement results of XRD (X-ray diffraction spectroscopy) shown in FIG. 2, peaks assigned to a structure of mayenite are shown, respectively, and it was confirmed that mayenite was formed.

Here, a yield of mayenite was 70% in Example 2, and a yield of mayenite was 70% in Example 3.

Comparative Example 1

For comparison, although the same experiment as that in the case of the above-described Example 1 was conducted, a different point from the case of Example 1 resides in a point that the baking temperature of katoite was set to 250° C. a result, a pattern (Mayenite 250) of measurement results of XRD (X-ray diffraction spectroscopy) shown in FIG. 2 is the same as a pattern of XRD of Katoite, and it was confirmed that mayenite was not formed.

The invention claimed is:
1. A production method of mayenite ($Ca_{12}Al_{14}O_{33}$), comprising the step of:
baking katoite [$Ca_3Al_2(OH)_{12}$] to form mayenite, wherein the katoite is generated by introducing aluminum and calcium hydroxide [$Ca(OH)_2$] into water and reacting the aluminum and calcium hydroxide with the water.

2. The production method of mayenite according to claim 1, which is characterized in that the baking temperature is from 300 to 500° C.

3. The production method of mayenite according to claim 1, wherein the temperature of the water is room temperature, and the molar ratio of aluminum to calcium hydroxide is from 2/3 to 7/6.

* * * * *